Oct. 13, 1953   J. O. WHITELEY, JR., ET AL   2,654,949
ARTIFICIAL TOOTH AND METHOD OF FORMING THE SAME
Filed Feb. 23, 1949   3 Sheets-Sheet 2
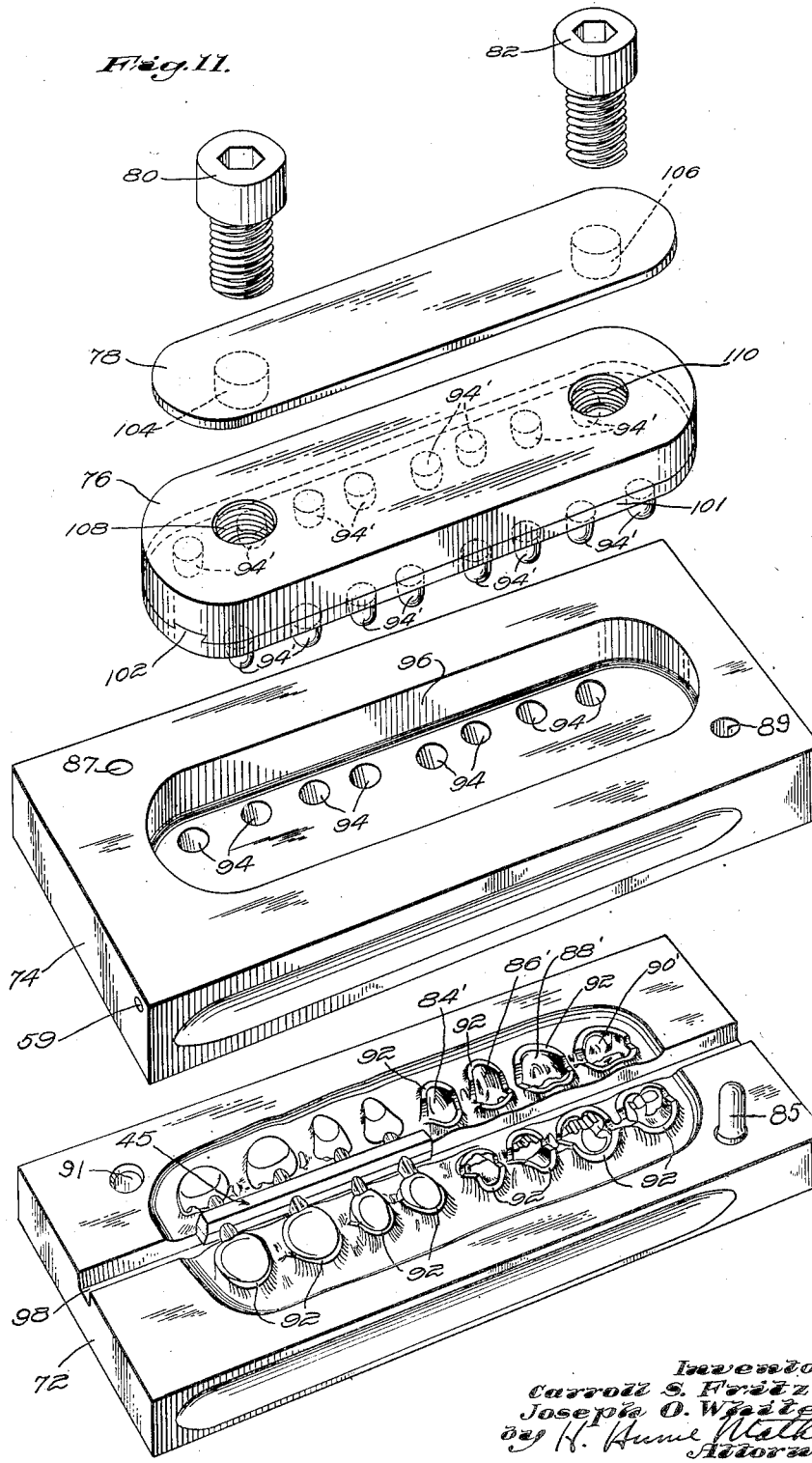

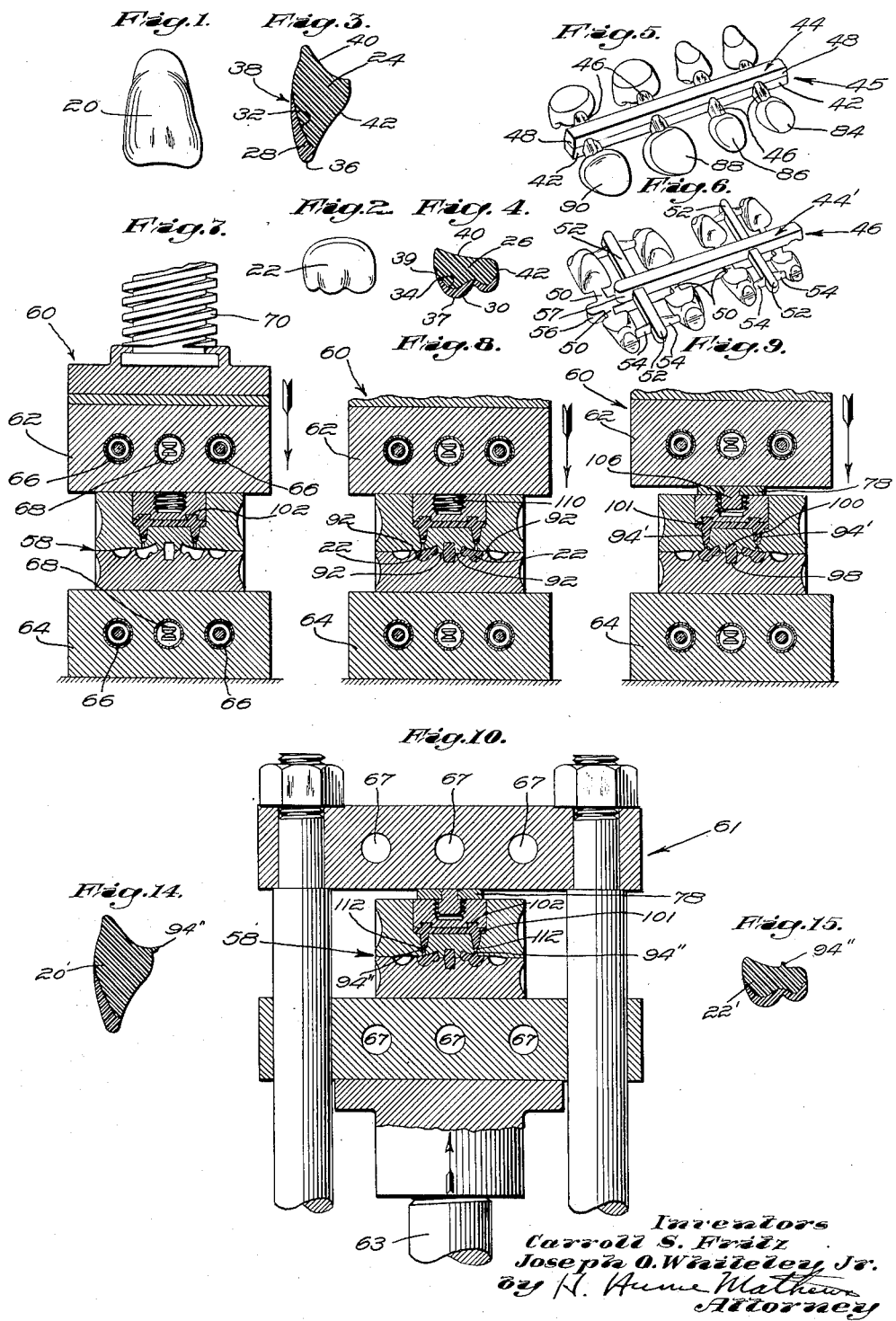

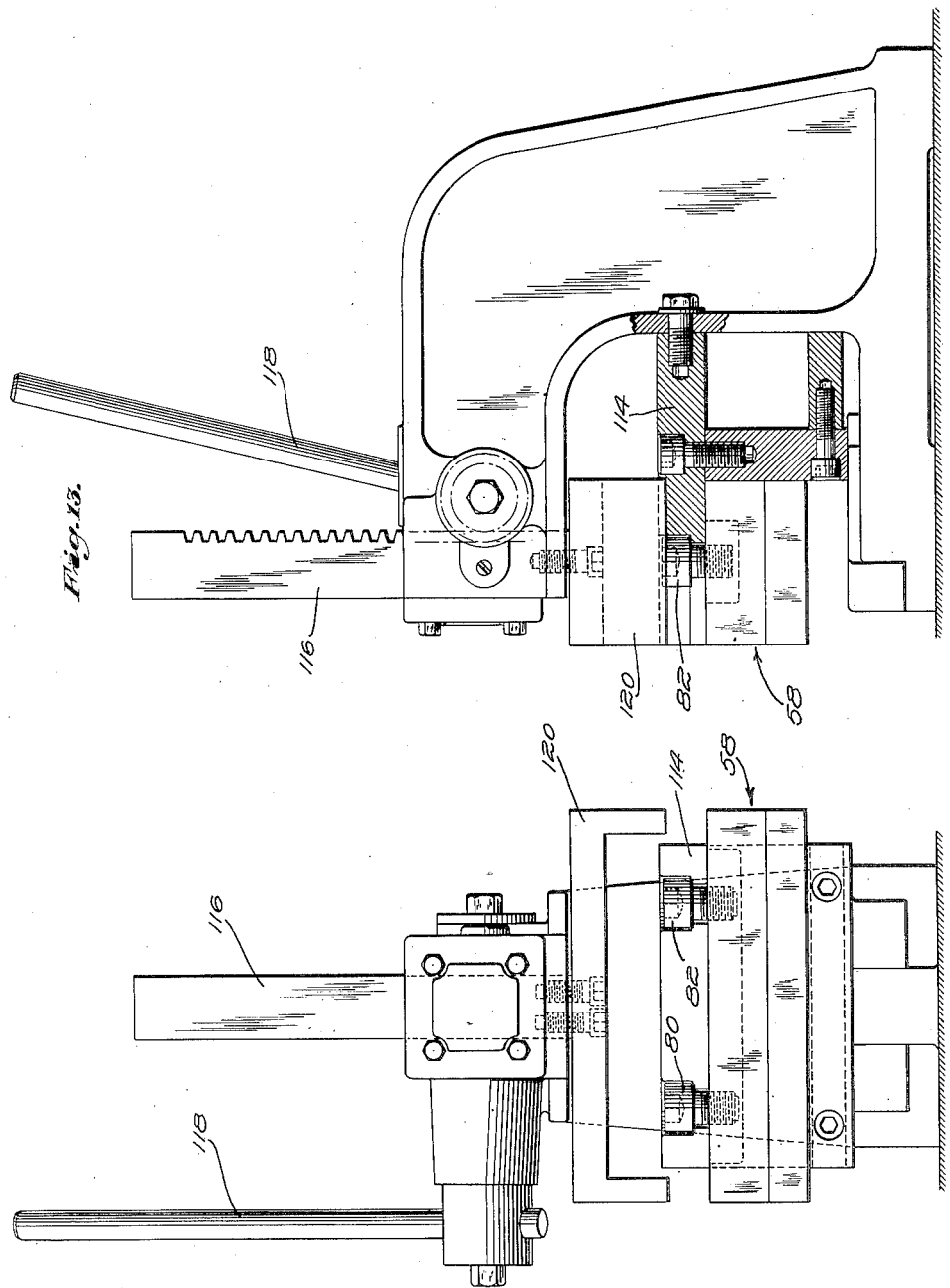

UNITED STATES PATENT OFFICE 2,654,949

ARTIFICIAL TOOTH AND METHOD OF FORMING THE SAME

Joseph O. Whiteley, Jr., Menlo Park, Calif., and Carroll S. Fritz, York, Pa., assignors to The Dentists' Supply Company of New York, New York, N. Y., a corporation of New York Application February 23, 1949, Serial No. 77,892

7 Claims. (Cl. 32—8)

This invention relates to artificial teeth, and particularly to a method and apparatus for making improved artificial teeth having superior qualities of appearance and durability in use.

In the Thornton Patent No. 2,345,305, assigned to applicants' assignee, a method is disclosed for manufacturing synthetic resin teeth by an injection molding process which utilizes the shader mold principle of the Clapp Patent No. 1,547,643, also assigned to applicants' assignee. This Thornton modification of the Clapp method enables a synthetic resin tooth to be formed by a commercially practicable process which provides for the separate or individual molding of different parts of the tooth, such as the enamel portion and the body portion, from compositions of different characteristics. The enamel and body compositions may each be independently varied and selected and their relative size, shape and placement may be exactly controlled. Thus a tooth of practically any desired appearance may be made, yet uniformity of size, shape and appearance of all teeth in any particular mold and shade can be obtained; exact duplicates of previously molded teeth may also be made, at any time.

While the present invention is not limited in its application to teeth, as made by the Thornton method, it is particularly adapted for use with such teeth, and it is a primary object of the invention to provide improvements in injection molded or "flow-molded" teeth as manufactured by the two-stage process disclosed in said Patent No. 2,345,305. It has been found in practice that such two-stage injection molded teeth are considerably improved in appearance and quality, and particularly in durability under service conditions, by being subjected to a finish molding operation in accordance with the teaching of this invention.

A most important goal in the manufacture of artificial teeth is to produce a product of the highest quality. Cost and manufacturing difficulties are of secondary importance; it is essential that a tooth adequately withstand normal use and even abuse. Failures may cause hardship to the patient and they waste the artistry and skilled efforts of the dentist or technician out of all proportion to the cost of the tooth per se. Therefore, it is a requisite of any good artificial tooth that it should satisfactorily withstand the strains and use or abuse to which it is subjected under normal, and even abnormal service conditions.

A prime object of the present invention is to provide an artificial synthetic resin tooth having improved qualities which enable it better to withstand the severities of service use. In general, these improved qualities are provided according to the invention by a finish molding process and apparatus in which and by which the pre-molded tooth (for instance as made by the Thornton two-stage injection process or any similar "flow" process) is first gripped over substantially its entire surface by a mold cavity which is a replica of the cavity in which the tooth was pre-molded or injection molded, thereby holding the enamel and body portions in their proper relative locations, then heating and compressing the tooth until it is softened and shaped without appreciable flow or deformation exactly to the surface contour of the mold cavity, then subjecting the softened material of the tooth to hydraulic pressure while simultaneously compressing it with the finish mold surfaces, cooling the various portions of the mold and tooth material in a predetermined sequence while maintaining the tooth material under said pressure and adding or subtracting material in the exact amount necessary to compensate for shrinkage and/or expansion of the tooth material in at least the last stage of the process. Though each mold cavity of the finishing mold is a replica of the corresponding cavity of the injection mold in which the pre-molding is done, it is slightly smaller in the labial-lingual dimension, or in over-all size. Consequently, the process of the present invention compresses and tends to increase the density of the material in the pre-molded tooth but makes no great alteration in the shape of the tooth; in fact the gripping action of the finishing mold surfaces on the enamel and body maintain them in their proper relative positions and thereby prevent undesirable changes in the tooth blend during the finish molding process. The present process therefore maintains the blend that is established by the injection process, but while it makes little or no change in the blend, in other respects it considerably improves the physical properties of the tooth. Some of the more significant improvements provided include better bonding between the enamel and body compositions so that the tooth becomes in effect a unitary or one-piece structure which is as strong at the joint or interface between the enamel and body as it is at other points, improved resistance to distortion upon ageing or upon temperature changes or from other causes such as boiling or sterilizing, etc., a more homogeneous substantially strain-free internal structure which is much more resistant to cracking, checking, crazing, chipping, breaking, warpage or distortion than a conventionally molded tooth, and a surface having a relatively hard skin (as compared to the hardness of the tooth material beneath said skin), or a "skin effect," which considerably increases the resistance of the tooth surfaces to wear and abrasion as compared to a conventionally molded tooth.

Other objects and advantages of the invention and a full understanding of the principles thereof will be apparent from the accompanying drawings and the following description of a presently preferred embodiment of the invention, in which:

Figures 1 and 2 are perspective views of injection molded anterior and posterior teeth, respectively, prior to being finish molded by the process and apparatus of this invention.

Figures 3 and 4 are transverse sectional views of the anterior and posterior teeth, respectively, of Figures 1 and 2.

Figure 5 is a perspective view of a charge or cluster of posterior teeth, such as shown in Figures 2 and 4, just subsequent to their formation by an injection molding process as disclosed in Thornton Patent 2,345,305 and prior to being finish molded by the process and apparatus of this invention.

Figure 6 is a perspective of a charge or cluster of anterior teeth, such as shown in Figures 1 and 3, just subsequent to their formation by an injection molding process as disclosed by Thornton Patent 2,345,305 and prior to being finish molded by the process and apparatus of this invention.

Figure 7 is a transverse sectional view of a multiple cavity posterior tooth mold being heated in a heater press, preparatory to charging with a tooth cluster, or clusters, such as shown in Figures 5.

Figure 8 is a view like Figure 7, but with a tooth cluster in place.

Figure 9 is a view like Figure 8 showing how force may be applied to the resin in a pressure chamber, which is connected separately to each molding cavity, by a pressure plate inserted between the mold and one of the press platens.

Figure 10 is a view similar to Figure 9 but showing the mold and pressure plate in a cooling press, rather than a heating press.

Figure 11 is a perspective exploded view of the mold and pressure plate of Figures 7 to 10, and including two extraction screws which are used with the press of Figures 12 and 13.

Figures 12 and 13 are front and side views, respectively, with the side view partly in section, of an extraction press which may be used to disassemble the mold of Figures 7 to 10 subsequent to a finish molding operation.

Figures 14 and 15 are transverse sectional views of finish molded anterior and posterior teeth, respectively, as made by the process and apparatus of this invention.

According to the present invention thermoplastic resin teeth which have been pre-formed or pre-blended into approximately the desired shape and size are finish molded by a novel process and with a novel apparatus which provide considerable improvement in the desired qualities of the finished product, with particular reference to greater surface hardness and/or wear resistance, greater accuracy of size and shape, smoother surface and finer surface detail, freedom from internal strain, resistance to distortion on heating and complete elastic amnesia or loss of elastic memory, greater strength of bond between the enamel and body portions, and elimination of defects, imperfections and appendages such as heat marks, sink marks, blow holes, voids, excess flash and gates or sprues. Preferably, the pre-molding is done by a flow process, such as injection or transfer molding, which provides a non-granular tooth with uniform pigment dispersion.

The preferred embodiment of the invention shown in the drawings is particularly adapted to finish mold a two stage injected tooth, of the type formed by the process disclosed in the Thornton Patent 2,345,305. Such a tooth is illustrated in Figures 1 to 4, and may be either an anterior tooth 20 or a posterior tooth 22. Both the anterior and posterior comprise a body portion (24 and 26) and an enamel portion (28 and 30) joined along a blend line or surface (32 and 34). The enamel of the anterior forms the incisal tip 36 of the tooth and also constitutes the majority of the labial surfaces 38, while the body forms the gingival end or ridge lap 40 and constitutes the majority of the lingual surface 42 of the tooth. The enamel is extended around the sides of the tooth so as to cover the mesial and distal surfaces either wholly or partially, to an extent determined largely by the appearance desired and by the problems of mold production. In the posterior, the enamel forms the occlusal surface 37 and part of the buccal surface 39 and the lingual surface 42.

Figures 5 and 6 show clusters 45 and 46 of posterior and anterior teeth respectively, as formed by a two-stage injection molding process like that disclosed in Thornton Patent No. 2,345,305. These clusters each comprise eight teeth individually connected by short runners to a single main or transverse runner.

In the case of the posteriors of Figure 5 the enamel portions (see 30 in Figure 4) are first formed with the enamel composition being injected into a mold consisting of a face mold part and a shader mold part through channels which form the enamel portions 42 of the transverse runner 44 and the short runners 46. The shader mold part is then replaced with a back mold part and the body material is injected through separate channels overlying the enamel channels and which form the body portions 48 of the transverse runner 44 and the short runners 46. The enamel portions of the teeth and the runners are ordinarily hard and relatively cool when the hot body material is injected thereover and consequently the enamel retains its pre-formed shape and also acts as a part of the molding surface which shapes or molds the body material. At the same time, the hot body material softens the enamel, and particularly the surface thereof contacted by the body material, sufficiently to form a fused bond or joint between the body and enamel at their interface. The resulting product comprises a cluster of teeth each comprising separately molded and accurately blended enamel and body portions. To facilitate manufacture a large number of these clusters can be molded simultaneously, if desired, for instance by feeding a number of the transverse runners 44 from a central sprue and gate (not shown).

The anteriors of Figure 6 are similarly formed, though in this case the short enamel runners 50 are preferably offset from the short body runners 52. The enamel portion of each tooth is formed by material fed into the molding cavities at the incisal edge of the tooth, while the body portion is formed by material fed through branches 54 from the short body runners 52 into the molding cavity at the mesial or distal surface of each tooth adjacent to the gingival end. The transverse runner 44' of the anterior cluster also of course has an enamel portion and a body portion, respectively shown at 56 and 57.

The process and apparatus of the present invention is shown in Figures 7 to 13 as applied to the posterior tooth cluster of Figure 5, but it is of course applicable in the same manner to the anterior tooth cluster of Figure 6. In either case the process and the apparatus is substantially the same, except of course that in the finish molding of anteriors the mold is designed to fit the anterior tooth clusters, rather than being designed to receive posterior tooth clusters as in the embodiment of Figures 7 to 11. The apparatus used in the preferred form of the invention illustrated in the drawings, and in connection with which the process or method will be described, comprises four main items of equipment; the heater press of Figures 7, 8 and 9, the cooling press of Figure 10, the specially constructed mold of Figure 11, and the extraction press of Figures 12 and 13.

Heater press 60 may be of conventional design. It should be capable of exerting a pressure of from 1000 to 2000 lbs./sq. in. and of being heated to a temperature of from 310° to 350° F., with the temperature closely controlled so that it may be automatically kept within a range of about 5° F. on either side of the predetermined or selected temperature. In the form shown the press comprises upper and lower platens 62, 64 which are heated electrically by resistance windings 66, the flow of current through said windings and consequently the platen temperature, being controlled by an adjustable thermostat 68. Thus, the temperature of each platen is automatically regulated so as to be held at a substantially constant value selected by the setting or adjustment device (not shown) on the thermostat. The lower platen 64 is fixed in the bed or frame of the press so that when a mold 58 is placed between the platens it will be both compressed and heated by the platens as the upper platen is moved downwardly relative to the lower platen by the feed screw or piston 70.

Cooling press 61 may also be of conventional design and if desired could be exactly like the heater press 60 except that the platens are cooled by a refrigerant or coolant rather than electrically heated. Further, it should be capable of producing higher pressures, up to about 2500 lbs./sq. in. As shown in Figure 10 the cooler press is hydraulically actuated by piston rod 63, and it is cooled by the flow of a cooling liquid through passages 67.

Mold 58, best shown in Figure 11, comprises a face part 72, a back part 74, a plunger 76 and a pressure plate 78. A pair of threaded studs or cap screws 80, 82 may also be provided to facilitate disassembly of the mold subsequent to a molding operation. The face mold part contains a plurality of molding cavities in two groups of eight cavities each with each group arranged to receive one of the tooth clusters 45, as shown at the left of the face part 72 in Figure 11. Four of these cavities, for two bicuspids as at 84, 86 and two molars as at 88, 90 (see Figure 5) are respectively shown at 84', 86', 88' and 90' (Figure 11). The back mold part 74 is similarly provided with correspondingly grouped cavities so arranged that when the two mold parts are fitted together in a predetermined relationship, determined by the registry or guide pins 85, 87, which fit respectively into the holes 89, 91, that each cavity in the face part will exactly register with the corresponding cavity in the back part to form a complete molding cavity. Each cavity is bounded at the parting line by a cut-off or sealing surface 92 and these surfaces are very accurately machined or fitted to each other so that the molding cavities will be substantially completely sealed or closed at the parting line between the two mold parts when the mold parts are assembled and compressed. Thus each cavity is in effect sealed at the mating surfaces 92 of the face and back mold parts when the mold is assembled and compressed into fully closed position and the cavities are then completely closed except for the individual transfer passages or sprues 94 which connect each molding cavity with the reservoir or resin chamber 96 in the top of the back mold part 74. The several cavities are not only spaced in accordance with the spacing of the teeth in the cluster, so that each of the two groups of cavities in the mold will receive one cluster, but each individual cavity is of the same shape or form as the tooth which it is adapted to receive. Thus each tooth is held in its original shape during the finish molding process, with little or no flow of tooth material either into or out of the mold or within the molding cavity itself. There is some decrease in size, however, because the molding cavities in Figure 11 are made slightly smaller, particularly in the labial-lingual aspect or direction, than the corresponding cavities of the injection mold in which the cluster 45 was formed. This difference in size, though slight, provides for considerable compression of the teeth as the finish mold is closed, until the parting surfaces 92 meet, with such excess material as may not be taken up through contraction or increased density of the tooth material upon compression thereof being squeezed out past the sealing edges 92. The sealing edges extend completely around each tooth recess or cavity at the parting line and therefore act to cut off each of the short runners 46 (or 50 and 54 in the case of anteriors), severing each tooth from its support or cluster. Longitudinal grooves 98, 100 are provided respectively in the face part and the back part to receive the main runners 44 of the clusters and thus prevent their interference with the closing or compression of the mold. Similar grooves would, of course, also be provided in an anterior mold for the runners 52.

A very important difference in the construction of the mold of Figure 11, as compared with conventional compression molds for artificial teeth, lies in the provision of the resin pressure chamber 96 and in its connection by individual or separate double tapered transfer passages 94 to each tooth molding cavity, and in the means for heating and applying pressure to the resin in the pressure chamber. This chamber comprises an elongated slot or recess machined in the back mold part and having straight vertical side walls, rounded or semi-circular vertical end walls, and a flat bottom. The plunger 76 closely fits the side walls so as to form a substantially resin-tight joint therewith though being free to move up and down in the chamber when subjected to any appreciable force. A quantity of resin 101, or a resin "pre-form" is placed in the chamber underneath the plunger in an amount sufficient to just fill the transfer passages 94 and the reservoir or space between the bottom of the plunger and the back mold part when the top surface of the plunger is just flush with the top surface of the back mold part.

While the process is not limited to any particular moldable or plastic material it is primarily intended for use with thermoplastic, or uncured or incompletely cured thermosetting resins (or a combination or mixture thereof) which are capable of being preformed into enamel and body tooth portions that can be bonded together by heat and pressure during the final molding process. It is preferred to fill the pressure chamber with the same plastic or resin from which the tooth is made, preferably a plastic or resin of the same composition as the body portion of the tooth. For example, in the embodiment of the drawing the teeth 20 and 22 are composed of acrylic resin, specifically methyl methacrylate or a resin known commercially as DuPont H. G. 22, with the enamel and body compositions being of the same material except that they contain different pigments and/or different amounts of pigment, and the resin 101 in the pressure chamber 96 is the same as that of which the body is composed. The pre-form or resin 101 is keyed or dove-tailed to the bottom surface of the plunger, as shown at 102, for movement therewith.

When the plunger is flush with the mold very little pressure will be exerted on the resin underneath the plunger, though heat will be transmitted thereto from the press platen through the plunger as well as through the mold itself. When it is desired to apply pressure to the resin, the pressure plate 78 is placed on top of the plunger, with the locating pins 104, 106 loosely fitted in the threaded holes 108, 110. With this arrangement, platen force is applied directly to the pressure plate when the assembly is compressed and this force is transferred completely to the plunger, which in turn exerts pressure on the resin therebeneath. Because the resin in the chamber is separately connected by individual transfer passages 94 to each tooth, this pressure is transmitted hydraulically to each tooth and creates an internal pressure in the material of each tooth which is substantially equal to the pressure exerted on the resin in the pressure chamber. After a pressing operation the resin, of course, tends to stick to the walls of the chamber and transfer passages as it is cooled and hardens, and it becomes fast at the points 112 of double or reverse taper in the transfer passages. To free the plunger and the resin, pressure plate 78 is removed and the studs 80 and 82 are screwed in the holes 108 and 110, providing a purchase for gripping the plunger to enable its removal by an extraction press or like device. When the plunger is lifted out of the mold part it brings the resin with it, because of the interlock 102, breaking the several rods 94' of resin in the transfer passages at their points 112 of smallest cross-section. The double taper of the transfer passages enables the breaking point or point of smallest cross-sectional area to be readily located at a desired point near the tooth and facilitates removal of both the reservoir material and the teeth.

For posteriors, transfer passage 94 terminates on the ridge lap of the tooth, and the small rod portion 94" between the tooth and the point 112 is removed with the tooth while the large rod portion 94' adheres to and is removed with the resin 101. For anteriors the transfer passage is located at the gingival on the lingual and the small rod portion 94" is located as shown in Figure 14. Transfer passages 94 are preferably of different sizes and have their cross-sectional areas at the points 112 of smallest area proportioned to the volumes of the respective mold cavities; i. e. the larger tooth cavities have larger cross-sectional areas at the points 112.

A convenient means for extracting the plunger 76 with the aid of studs 80 and 82 is the extraction press of Figures 12 and 13. The mold is inserted in the press with the heads on studs 80 and 82 fitted into slots in the face plate or fixture 114. Ram 116 is then forced downwardly by rotating handle 118 and the head 120 thereon engages the two ends of the mold and forces it downwardly, extracting the plunger (and the resin keyed thereto) from the chamber and leaving it suspended on the support 114.

In carrying out the process of the present invention with the mold of Figure 11, the face half and the back half of the mold are assembled with the help of the guide pins so that their tooth cavities register. Then the reservoir in the back half is charged with either an injection molded pre-form (shown at 101 in Figure 11) or granulated powder, the same material and color as the body portions of the teeth in the cluster of Figure 5, to be finished molded. The plunger is placed in the chamber and the whole assembly is placed in the heating press as shown in Figure 7. The plunger fits into the chamber so that its top surface is flush with the top surface of the back mold. Thus the two mold halves and the plunger are heated simultaneously and quickly by direct contact with the hot platens of the press. The mold is heated until it has reached a predetermined temperature (310° to 350° F., preferably 330° F. for the heat resistant methyl methacrylate commercially available as DuPont H. G. 22), determined either by time in the thermostatically controlled press, or by a thermometer inserted in the hole 59 in the mold. These temperatures will of course be different for other resins but in any case the lower limit is made sufficiently high that the resin used will lose its elastic memory within a reasonable or practicable heating time of a few minutes and the upper limit is made sufficiently low that the resin will not materially depolymerize or adversely change its chemical state or become excessively fluidized to a point where appreciable flow might occur, for instance at the parting line by escape from the mold cavity, or otherwise.

The hot mold is then removed from the press and the mold halves are separated so that two cold clusters of teeth (Figure 5) at room temperature may be placed therein. The cluster may contain any number of teeth, and the mold 58 may be designed to receive one or more charges. However, eight teeth to a cluster and two clusters to a mold, as shown in Figures 5 and 11, are preferred. The injected teeth, as shown in Figures 1 to 6, are the same shapes as, but slightly thicker than, the corresponding cavities of mold 58. They will therefore not be materially distorted, but will be compressed, when the mold is closed thereon.

The hot mold, having been charged with cold tooth clusters, is reassembled and returned to the heating press as shown in Figure 8. Pressure is quickly applied, to close the mold rapidly. Thus the enamel and body surfaces of each tooth are gripped or held by the surfaces of the mold cavity before the tooth material is softened. As the hot mold closes, its sealing or parting surfaces contact the short runners 46 and soften and sever them from the teeth to which they are joined. This permits the mold to close completely and to press directly on the surface of the relatively cool teeth, and especially the occlusal, buccal and lingual faces of the teeth, forming a substantially unbroken or continuous molding surface (except for the transfer passages 94) completely surrounding each tooth. Pressure must be kept on the teeth during heating to hold the enamel and body in their exact relative positions as injected. If pressure is not maintained on the teeth during this heating, the residual strains and elastic memory created in the injection process by which the teeth were pre-formed will cause the enamel to draw back toward the injection gate and thicken at the thin tapered edges where it joins the body on the buccal and lingual faces. This creates an objectionable line of demarcation where the thickened enamel ends on the face of the tooth.

As soon as the mold closes completely (Figure 8), the heating press is opened, the mold is briefly removed, and the pressure plate 78 is placed on top of the plunger with the two locating studs 104, 106 fitting into the plunger holes. The assembly is then immediately returned into the heating press before it has a chance to appreciably cool and pressure is again applied, this time directly to the plunger, and through it to the back mold part. The pressure chamber or reservoir 96 is made sufficiently wide and long that its projected area on a plane normal to the direction of applied force is greater than the projected area of the teeth, the ratio of said areas being about 1.7 to 1. Therefore, the pressure applied to the plunger by the upper press platen is transmitted hydraulically through the hot, soft and semi-fluid resin in the reservoir to the back mold part to create a resultant mold closing force which exceeds the mold opening force of the resin in the tooth cavities. Therefore, the upper platen force acting on the pressure plate alone keeps the mold halves closed, and in sealed engagement along their parting surfaces 92. At the same time the resin in the pressure chamber is placed under high pressure (for instance about 1000 lbs./sq. in.) and this pressure is transmitted through the transfer passages 94 to the tooth material in the several molding cavities. Thus the tooth material is simultaneously confined externally by the mold surfaces and subjected internally to hydraulic pressure through the transfer passages. Resin may flow, of course, either to or from the pressure chamber and each tooth cavity through the transfer passages. Actually, the amount of such flow is very small and occurs automatically only to the extent necessary to compensate for shrinkage or contraction of the tooth material during the last stage or stages of the finish molding process. Because the mold cavities are all connected to a common pressure chamber or reservoir the tooth material therein is maintained under equal pressures and each tooth will be finish molded at substantially the same temperature and pressure.

The mold remains in the heating press as shown in Figure 9 until the teeth have been completely heated throughout, to about 330° F., at which temperature they are soft and rubbery. This requires about 1½ minutes with a mold temperature of 330° F. The combination of heat and pressure effect the complete union of body and enamel, and the high temperature eliminates the residual strains and elastic memory created by the previous injection or flow molding of the teeth.

The assembly is next removed from the heating press and transferred to the cooling press as shown in Figure 10, where pressure is maintained on the plunger through the pressure plate to keep the reservoir material under a pressure of from 1100 to 2300 (preferably 1800) pounds per square inch. As the teeth cool and contract, material flows into them from the reservoir to keep them filled, thus eliminating heat marks, sink marks or bubbles. The uniform internal pressure applied hydraulically to the material of each tooth minimizes strains, particularly at the mold parting line where such strains normally occur in ordinary compression molding. The back half 74 of the mold cools more slowly than the face 72 because it is thicker and neither it nor the plunger is in direct contact with the upper cooling platen, while the face part completely contacts the lower cooling platen. Therefore, the plastic material in the reservoir cools more slowly than the teeth and because of its longer period of fluidity, continues to fill the contracting teeth. Each tooth is cooled progressively, posteriors from the occlusal or enamel portion in the more rapidly cooling face mold part to the gingival or body portion in the more slowly cooling back mold part and in the case of anteriors, which are received in the mold with their labial half in the face mold part and their lingual half in the back mold part, the enamel face and incisal tip is cooled more rapidly than the body. Further, when molding anteriors the transfer passages 94 are connected to the cavities at the point represented by 94″ in Figure 14, adjacent the thickest portion of the tooth, so that the transfer passage is connected to that part of the tooth which hardens last, or near the last. Also, and particularly for posteriors, larger transfer passages are provided for the larger teeth to compensate for the longer time required to completely cool and harden the larger teeth.

When the back half of the mold has cooled to about 220° F. the assembly is removed from the cooling press. The pressure plate is removed and two studs 80, 82 are screwed into the plunger (Figures 12 and 13). The mold is placed in the harness on the extraction press, and the press handle is pulled, causing the end parallels on the frame to push the mold down, which partially withdraws the plunger from the back mold. Undercuts on the plunger (dove-tailed grooves 102 or undercut holes above the tapered holes in the back mold) grip the plastic material in the reservoir, and when the plunger is withdrawn, the connection with the teeth is broken. At 220° F. the material is still rubbery enough to release from any minute undercuts in the tapered holes, such as tool marks and porosity in the metal, and breaks at the minimum cross-section of the holes, releasing the teeth freely at that point.

After the mold halves are separated, the finish molded teeth (illustrated at 20′ and 22′ for anteriors and posteriors in Figures 14 and 15) are removed from the mold by rapping the mold with a mallet. This completes the cycle and the mold is reheated for the next charge. The reservoir needs re-loading about every seventh cycle, on the average, because of leakage from the mold and embrittlement of the reservoir material due to repeated heating.

It is to be understood that the invention is not limited to the specific embodiment herein illustrated and described, but may be used in other ways without departure from its spirit as defined by the following claims.

We claim:

1. A method of manufacturing artificial teeth comprising, forming by molding a tooth cluster having a plurality of teeth thereon each composed of fused and separately molded and united acrylic resin enamel and body portions, placing said cluster at a relatively low or room temperature in a hot compression mold at a relatively high temperature in the range from 310 to 350 degrees F., closing said mold simultaneously to fix and maintain the enamel and body portions of the teeth in their predetermined molded relative positions, maintaining said mold at a relatively high temperature until the material of said teeth becomes softened or semi-fluid, subjecting each tooth to hydraulic pressure while subjected to such temperature, and cooling said teeth while maintaining said pressure until they harden in the mold.

2. A method according to claim 1, in which said pressure is applied through individual passages separately connecting each tooth with a common reservoir containing a heated and flowable material under a relatively high pressure within the range from 1100 to 2300 pounds per square inch.

3. A method according to claim 2, in which the plastic material in the reservoir is a resin which is the same as the resin of the tooth body portion.

4. An artificial tooth of composite synthetic resin, said tooth being composed of separately molded, pre-formed and fused enamel and body portions homogeneously bonded and compressed into a unitary mass.

5. A method of manufacturing artificial teeth, comprising the steps of preliminarily molding from fused resin the enamel layers of a tooth cluster, then molding from fused resin the body portion of a tooth onto each of said enamel layers, then transferring the cluster of teeth thus formed to a set of compression and heating dies having cavities complementary in shape to said teeth and subjecting said preformed teeth to heat and pressure in said compression and heating dies for softening the enamel layers and body portions and thereby fusing them into homogeneously bonded and integral teeth.

6. A method of manufacturing an artificial tooth comprising the steps of, subjecting to compression a pre-molded thermoplastic synthetic resin tooth comprising a pre-molded fused body portion and a fused enamel layer partially bonded together by fusion between mold surfaces defining a cavity complementary to the shape of said fused and molded tooth and subjecting said tooth to heat sufficiently high to soften said tooth while so compressed between said mold surfaces, thereby completely bonding said body portion and enamel layer.

7. A method according to claim 6 in which additional thermoplastic resin is injected in the viscous flow stage into said mold cavity against said pre-molded tooth, thereby forcing said softened tooth into firm conformity with all mold surfaces defining said cavity.

JOSEPH O. WHITELEY, JR.
CARROLL S. FRITZ.

References Cited in the file of this patent

UNITED STATES PATENTS

| Number | Name | Date |
|---|---|---|
| 1,129,336 | Critcherson | Feb. 23, 1915 |
| 1,745,570 | Dimelow | Feb. 4, 1930 |
| 2,192,902 | Erdle | Mar. 12, 1940 |
| 2,230,164 | Myerson | Jan. 28, 1941 |
| 2,279,952 | Pryor | Apr. 14, 1942 |
| 2,345,305 | Thornton | Mar. 28, 1944 |
| 2,391,925 | Saffir | Jan. 1, 1946 |
| 2,454,847 | Slack, Jr. | Nov. 30, 1948 |